(12) United States Patent
Sato et al.

(10) Patent No.: US 12,476,048 B2
(45) Date of Patent: Nov. 18, 2025

(54) ELECTRONIC COMPONENT INCLUDING ACCOMMODATION PART HAVING OPENING

(71) Applicant: TDK CORPORATION, Tokyo (JP)

(72) Inventors: Takaaki Sato, Tokyo (JP); Akihiro Masuda, Tokyo (JP); Shinya Ito, Tokyo (JP); Norihisa Ando, Tokyo (JP); Hideki Kaneko, Tokyo (JP); Ken Aburakawa, Tokyo (JP); Kenya Tamaki, Tokyo (JP); Akitoshi Yoshii, Tokyo (JP)

(73) Assignee: TDK CORPORATION, Tokyo (JP)

( * ) Notice: Subject to any disclaimer, the term of this patent is extended or adjusted under 35 U.S.C. 154(b) by 322 days.

(21) Appl. No.: 18/096,766

(22) Filed: Jan. 13, 2023

(65) Prior Publication Data

US 2023/0268127 A1    Aug. 24, 2023

(30) Foreign Application Priority Data

Feb. 24, 2022 (JP) ................................. 2022-027092

(51) Int. Cl.
| | |
|---|---|
| *H01G 4/224* | (2006.01) |
| *H01G 2/10* | (2006.01) |
| *H01G 4/12* | (2006.01) |

(52) U.S. Cl.
CPC ............. *H01G 4/224* (2013.01); *H01G 2/106* (2013.01); *H01G 4/12* (2013.01)

(58) Field of Classification Search
CPC .......... H01G 4/224; H01G 2/106; H01G 4/12; H01G 2/065; H01G 2/10; H01G 4/228; H01G 2/06; H01G 4/005; H01C 7/008; H01C 7/10
See application file for complete search history.

(56) References Cited

U.S. PATENT DOCUMENTS

| | | | |
|---|---|---|---|
| 2014/0177131 A1* | 6/2014 | Miura .................... | H01G 2/103 361/303 |
| 2015/0348710 A1* | 12/2015 | Sato ........................ | H01G 2/04 29/25.42 |
| 2018/0033557 A1* | 2/2018 | Chien .................... | H01G 4/236 |

(Continued)

FOREIGN PATENT DOCUMENTS

| | | | |
|---|---|---|---|
| CN | 111863444 A | * | 10/2020 |
| JP | S51-83160 A | | 7/1976 |

(Continued)

*Primary Examiner* — Timothy J. Dole
*Assistant Examiner* — Daniel M Dubuisson
(74) *Attorney, Agent, or Firm* — Oliff PLC

(57) ABSTRACT

An electronic component including a case including an accommodation part having an opening; a ceramic element arranged in the accommodation part; a metal terminal including an electrode connecting part connecting to the ceramic element, a mounting part exposed out of the accommodation part, and a terminal arm part connecting the electrode connecting part and the mounting part; a case cover including a closing plate part covering the opening, and a case cover lateral side portion extending in a depth direction of the accommodation part from a circumference of the closing plate part and at least partially facing against an accommodation side wall of the accommodation part; and a mold resin filling the accommodation part.

10 Claims, 18 Drawing Sheets

(56) References Cited

U.S. PATENT DOCUMENTS

| | | | |
|---|---|---|---|
| 2018/0182553 A1* | 6/2018 | Yazawa | H01G 4/224 |
| 2018/0247766 A1* | 8/2018 | Fukuda | H01G 4/248 |
| 2020/0294719 A1* | 9/2020 | Masuda | H01G 4/40 |
| 2021/0225589 A1 | 7/2021 | Masuda et al. | |
| 2023/0187290 A1* | 6/2023 | Jozuka | H01L 23/24 |
| | | | 257/666 |

FOREIGN PATENT DOCUMENTS

| | | | |
|---|---|---|---|
| JP | H06-196348 A | | 7/1994 |
| JP | 2000228327 A | * | 8/2000 |
| JP | 2021-114557 A | | 8/2021 |

* cited by examiner

FIG.12
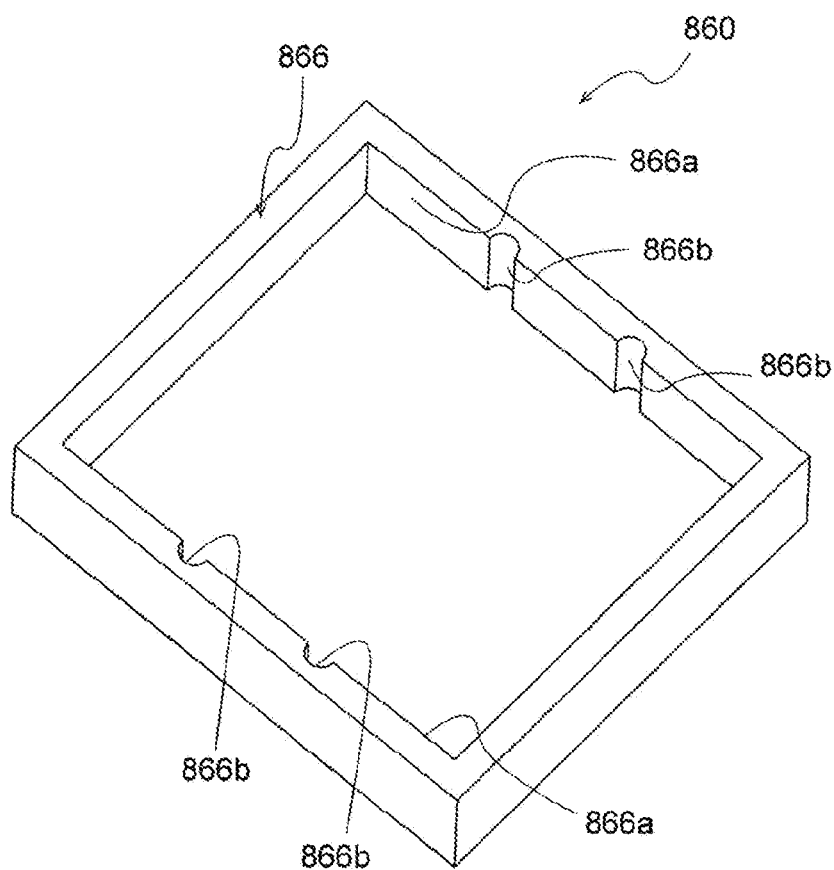
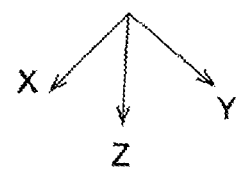

ELECTRONIC COMPONENT INCLUDING ACCOMMODATION PART HAVING OPENING

TECHNICAL FIELD

The present invention relates to an electronic component used as a capacitor and so on.

BACKGROUND

Conventionally, capacitors having structures of which metal electrodes are connected to a single plate type dielectric disk has been proposed. Also, an electronic component which is suited for surface mounting by molding an area around such dielectric disk with an exterior material has been proposed.

However, the conventional surface mounting electronic component requires a step of molding with an exterior material after fixing the dielectric disk and the metal terminals in a cavity used for resin molding. Hence, for the conventional surface mounting electronic component, an assembling step was complicated. Also, a metal mold needs to be changed along with depending on the size of the dielectric disk, thus it was difficult to flexibly correspond to the size changes of the dielectric disk.

[Patent Document 1] JP Patent Application Laid Open No. H06-196348

SUMMARY

The object of the present disclosure is to provide an electronic component capable of flexibly adjusting to a size change and so on of an internal ceramic element, and also capable of preventing unexpected adhesion of a mold resin to an outer surface of an electronic component.

The electronic component as one of embodiments solving the above-mentioned object includes
- a case including an accommodation part having an opening;
- a ceramic element arranged in the accommodation part;
- a metal terminal including an electrode connecting part connecting to the ceramic element, a mounting part exposed out of the accommodation part, and a terminal arm part connecting the electrode connecting part and the mounting part;
- a case cover including a closing plate part covering the opening, and a case cover lateral side portion extending in a depth direction of the accommodation part from a circumference of the closing plate part and at least partially facing against an accommodation side wall of the accommodation part; and
- a mold resin filling the accommodation part.

Such electronic component accommodates the ceramic element in the accommodation part of the case having the opening, hence, there is no need to have a step of molding using an exterior material after arranging the ceramic element and so on in a cavity of for a resin molding. Thus, such electronic component can flexibly correspond to the size change and so on of the ceramic element, and achieves a good productivity. Also, as the accommodation part is filled with a mold resin, the ceramic element and the like in the accommodation part can be easily protected, and also since the space between the case cover lateral side portion and the accommodation side wall holds excess mold resin, it prevents unexpected adhesion of the uncured resin which has leaked from the accommodation part to an outer surface of the electronic component.

Also, for example, the case cover lateral side portion may be facing a side wall outer surface of the accommodation side wall of the accommodation part, and
the side wall outer surface may be at an opposite side of an inner surface of the accommodation part.

Such electronic component can easily adjust a filling amount of the mold resin, and it can further effectively prevent the unexpected adhesion of the mold resin to the outer surface of the product.

Also, for example, at least one of surfaces facing each other between the case cover lateral side portion and the accommodation side wall may have a groove partially widening a width between the case cover lateral side portion and the accommodation side wall.

Such electronic component can hold more amount of the mold resin due to the space, hence it can further effectively prevent the unexpected adhesion of the mold resin to the outer surface of the product.

Also, for example, at least one of surfaces facing against each other between the case cover lateral side portion and the accommodation side wall may have a projection partially narrowing a width between the case cover lateral side portion and the accommodation side wall.

In such electronic component, the projection allows to accurately determine the shape of space, hence it can further effectively prevent the unexpected adhesion of the mold resin to the outer surface of the product and so on. Also, the case cover and the case are firmly fixed at an area where the space is narrow, and at an area where the space is wide, even more mold resin is held.

Also, for example, the case cover lateral side portion and the accommodation side wall may have surfaces facing against each other, and
one of the surfaces has a raised part and the other one has a depression to which the raised part fits.

In such electronic component, the raised part and the depression engage with each other, thus, relative position of the case and the case cover can be accurately adjusted. Therefore, the shape of the space holding the mold resin can be accurately controlled, and leakage of the mold resin can be effectively prevented. Also, a fixing strength between the case cover and the case can be enhanced as well.

Also, for example, the mounting part may be exposed out of the accommodation part through the opening, and
the mounting part may have a space passing part arranged at a space between the case cover lateral side portion and the accommodation side wall, and a mounting base part facing a mounting face side.

By exposing the mounting part through the opening of the accommodation part, the shape of the case can be simplified, and also leakage of the uncured mold resin from areas other than the opening can be prevented. Also, the space passing part of the mounting part is connected to the case and the case cover, thus, such electronic component has enhanced durability against the external force.

Also, for example, the accommodation side wall may surround a circumference of a base board of the case, and
the case cover lateral side portion may surround a circumference of the closing plate.

By arranging the accommodation side wall and the case cover lateral side portion in a way that these surround the circumference of the base board and the closing plate part, leakage of the uncured mold resin from the accommodation part can be prevented effectively. Note that, the accommodation side wall and the case cover lateral side portion may have parts which are discontinuous.

Also, for example, an inner side surface of the case cover lateral side portion may face a side wall outer surface of the accommodation side wall of the accommodation part which is facing an opposite side, the case cover lateral side portion may have a first groove at a first outer side surface which is one surface of outer side surfaces of the case cover lateral side portion, the case cover lateral side portion may have a first projection corresponding to a shape of the first groove at a second outer side surface facing a direction different from the first outer side surface.

Regarding such electronic component, the first projection fits to the first groove, thereby, plurality of electronic components can easily become integral electronic component. Thus, for example, the plurality of electronic components can be transferred all at once to the mounting position using a mounting apparatus having one suction arm, thus efficient mounting becomes possible.

Also, for example, an insulation member may be arranged between an electrode of the ceramic element and the terminal arm part in the accommodation part.

Such electronic component can suitably secure the insulation between the electrode of the ceramic element and the metal terminal even in the accommodation part with narrow space.

BRIEF DESCRIPTION OF THE SEVERAL VIEWS OF THE DRAWING(S)

FIG. 12 is a schematic perspective view of a case cover according to a fourth modification example viewing from diagonally below.

DETAILED DESCRIPTION

In below, each embodiment is described using the figures.

First Embodiment

Figure 1:
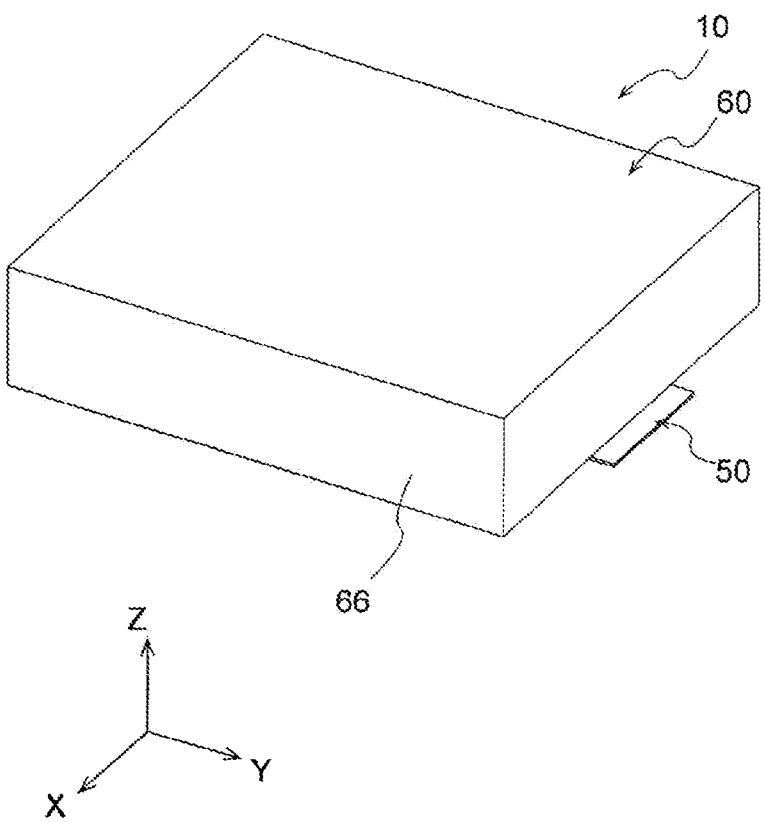
FIG. 1 is a schematic perspective view of an electronic component according to the first embodiment viewing from diagonally above.
Figure 2:
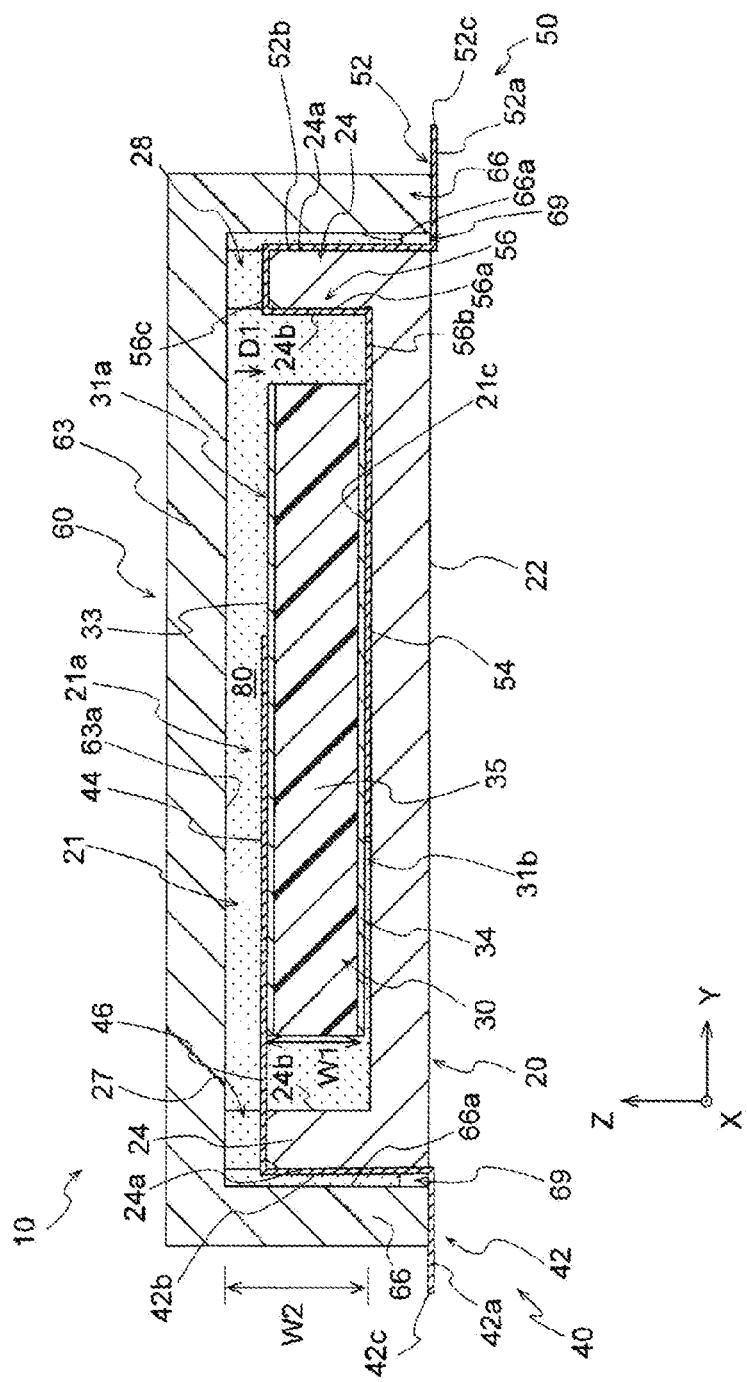
FIG. 2 is a cross section view of the electronic component shown in FIG. 1.
Figure 3:
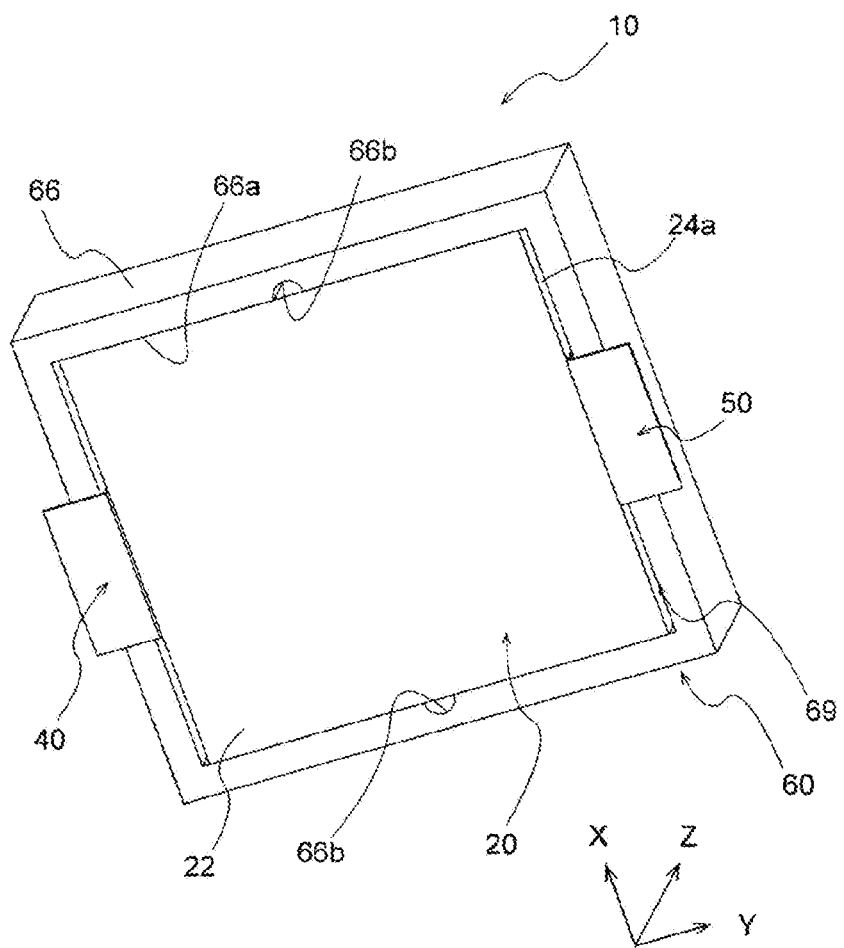
FIG. 3 is a schematic view of the electronic component shown in FIG. 1 viewing from diagonally below.
Figure 4:
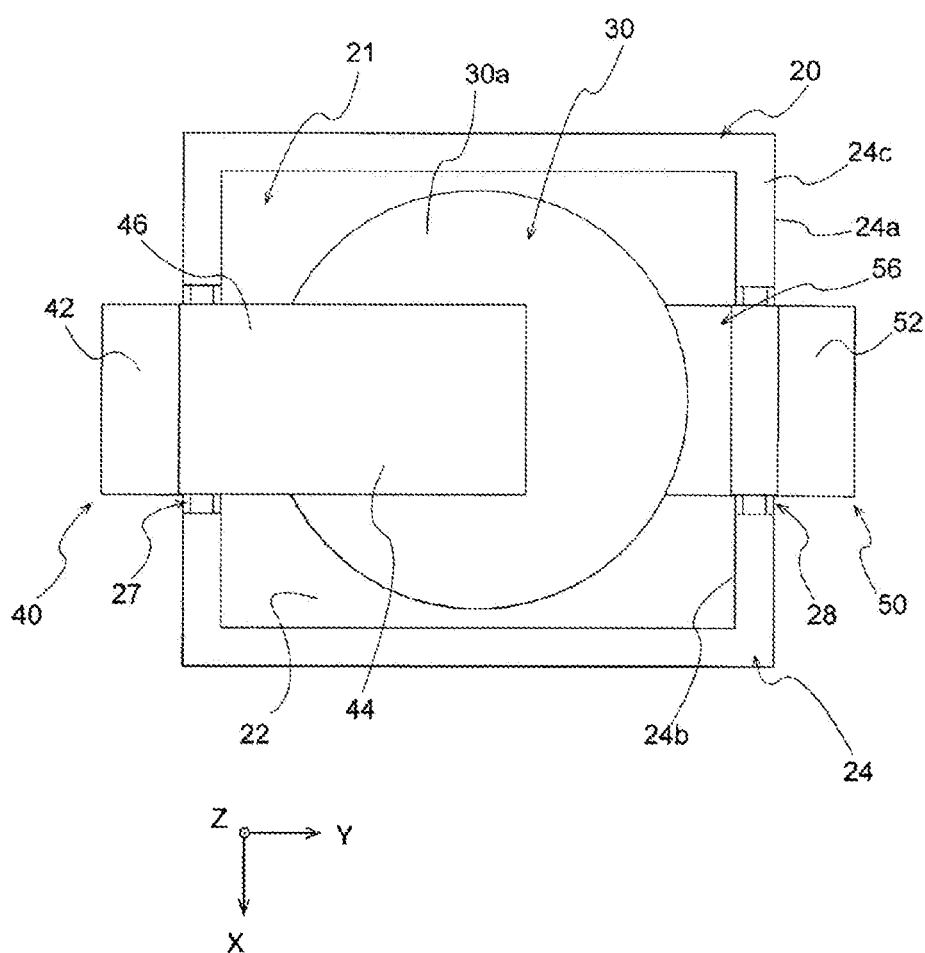
FIG. 4 is a planar view of the electronic component of FIG. 1 without a case cover and a mold resin.

FIG. 1 is a schematic perspective view of an electronic component 10 according to the first embodiment viewing from diagonally above. FIG. 2 is a cross section of the electronic component 10. FIG. 3 is a perspective view of the electronic component 10 viewing from diagonally below. FIG. 4 is an upper view of the electronic component 10 without showing a case cover 60 and a mold resin. As shown in FIG. 1 to FIG. 4, the electronic component 10 has a case 20 including an accommodation part 21 (see FIG. 2 and FIG. 4) in it, and a case cover 60 which covers an opening 21a (see FIG. 2) provided to the accommodation part 21. Also, as shown in FIG. 2 and FIG. 4, the electronic component 10 has a ceramic element 30 arranged in the accommodation part 21 of the case 20, a metal terminal 40 connecting to a first electrode 33 of the ceramic 30, and a second metal terminal 50 connecting to a second electrode 34 of the ceramic element 30.

As shown in FIG. 1, the electronic component 10 has an approximately rectangular plate shape, but it is not limited to this, and it may be any other shape such as a polygonal plate shape, a circular disc shape, and the like. As shown in the cross-section image of FIG. 2, an opposite side of where a closing plate part 63 of the case cover 60 of the electronic component 10 is arranged is a mounting face side facing a substrate and so on which is where the electronic component 10 is actually mounted.

Note that, as shown in FIG. 2, when explaining the electronic component 10, a normal direction to the base board 22 of the case 20 is Z-axis direction, Y-axis direction is a direction perpendicular to Z-axis direction and connecting the first mounting part 42 and the second mounting part 52 with a minimum distance, and a direction perpendicular to Y-axis direction and Z-axis direction is X-axis direction.

As shown in FIG. 2 and FIG. 4, the case 20 has the accommodation part 21 having a recessed shape, and accommodates the ceramic element 30 and so on in the accommodation part 21. The accommodation part 21 has a rectangular shape slightly smaller than the outer shape of the case 20 when viewed from the opening 21 side of the accommodation part 21. The accommodation part 21 includes a space of an approximately rectangular parallelepiped shape which is formed inside the case 20. The opening 21a of the accommodation part 21 is formed to the case 20 so that the direction facing the upper side of the electronic component 10 (the opposite side of the mounting face) is opened.

As shown in FIG. 2 and FIG. 4, the case 20 has the base board 22 of an approximately rectangle plate shape which is configuring the base board of the case 20, and an accommodation side wall 24 which is a side wall of the accommodation part 21. The accommodation side wall 24 extends from the circumference of the base board 22 to the upper side in a depth direction D1 (parallel to Z-axis direction). As shown in FIG. 4, the accommodation side wall 24 surrounds the circumference of the base board 22 of the case 20, and the accommodation side wall 24 has a frame-like form.

As shown in FIG. 4, an upper end of the accommodation side wall 24 forms an opening edge 24c surrounding the opening 21a of the case 20. At the opening edge 24c, step parts are formed to two places where the heights are lower than other parts. Due to these step parts, the opening 21a extends to part of the side face of the case 20. The step parts of the case 20 form a first space 27 and a second space 28 to which the first metal terminal 40 or the second metal terminal 50 is inserted when the case cover 60 is installed to the case 20 as shown in FIG. 4.

Figure 5:
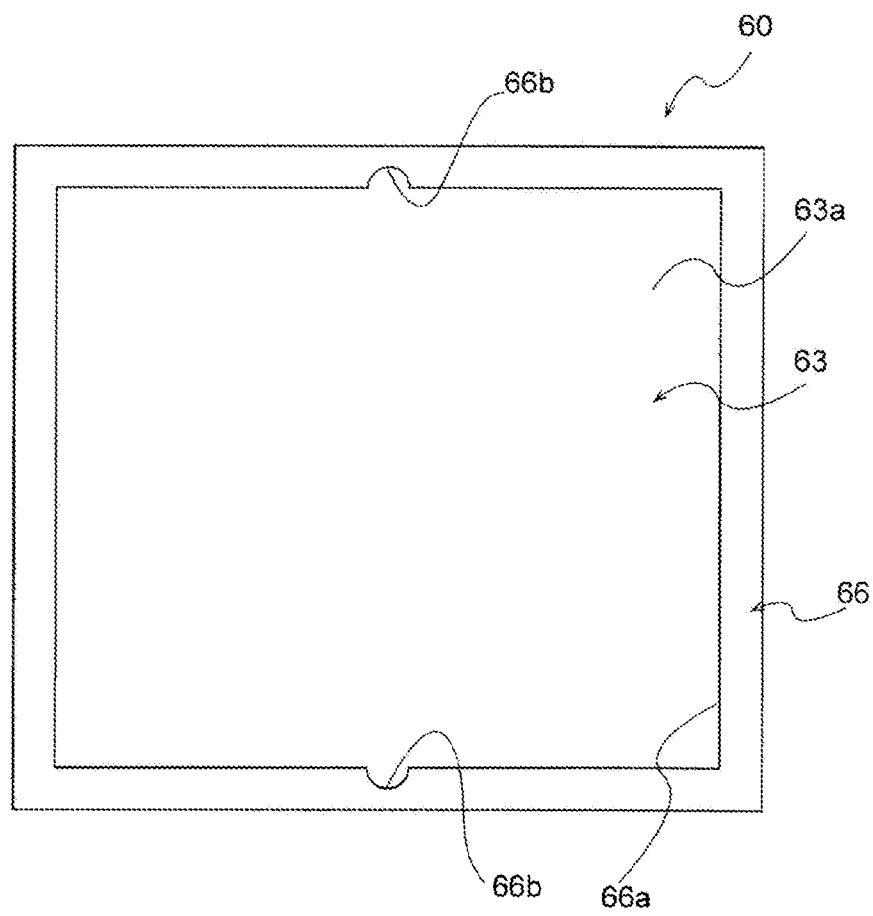
FIG. 5 is a bottom view of the case cover of the electronic component shown in FIG. 1.

FIG. 5 is a planar view of the case cover 60 viewing from below (from the side of the accommodation part 21). As shown in FIG. 5 and FIG. 2 showing the cross section of the electronic component 10, the case cover 60 has a closing plate part 63 of approximately rectangular plate shape which at least partially cover the opening 21a of the accommodation part 21, the case cover lateral side portion 66 extending from the circumference of the closing plate part 63 in depth direction D1 of the accommodation part 21. As shown in FIG. 5, the case cover lateral side portion 66 surrounds the circumference of the closing plate part 63.

As shown in FIG. 2, the closing plate part 63 is arranged to the side of the opening 21a which is at the opposite side of the mounting face of the case 20. Also, the case cover lateral side portion 66 at least partially faces the accommodation side wall 24 of the accommodation part 21. The case cover 60 has the closing plate part 63 of a rectangular plate shape. As shown in FIG. 2, the case cover lateral side portion 66 faces a side wall outer surface 24a of the accommodation side wall 24 which is the surface facing the opposite side of the accommodation part 21. Note that, the case cover lateral side portion 66 is not limited to those facing the side wall outer surface 24a, and the case cover lateral side portion 66 may face a side wall inner surface 24b of the accommodation side wall 24 which is the surface facing to the accommodation part 21.

As shown in FIG. 2 and FIG. 3, a lower end of the case cover lateral side portion 66 extends to a plane which is roughly the same as a lower end of the case 20 (a lower face of the base board 22). Note that, the lower end of the case cover lateral side portion 66 and the lower face of the case 20 may be at different heights.

As the dotted area of FIG. 2 shows, a mold resin 80 fills the accommodation part 21. The mold resin filling the accommodation part 21 is not particularly limited, and for example, it may be an epoxy-based resin, a silicone-based resin, and the like. Note that, in FIG. 3 and FIG. 4, the mold resin 80 is omitted in order to describe the shapes of other members.

As shown in FIG. 2 and FIG. 3, a lateral side space 69 is formed between a case cover lateral side inner surface 66a and the side wall outer surface 24a which are surfaces facing each other at the case cover lateral side portion 66 and the accommodation side wall 24. As shown in FIG. 2, the lateral side space 69 formed between the case cover lateral side portion 66 and the accommodation side wall 24 functions as a resin pool of the uncured mold resin 80 which has leaked from the accommodation part 21 during production. As such, in the electronic component 10, the lateral side space 69 holds the excess mold resin 80, hence, this prevents unexpected adhering to the product outer surface of the uncured mold resin 80 which has leaked from the accommodation part 21.

As shown in FIG. 3 and FIG. 5, at least one of surfaces facing each other between the case cover lateral side portion 66 and the accommodation side wall 24 has a groove 66b partially widening a width of a lateral side space 69 formed between the case cover lateral side portion 66 and the accommodation side wall 24 (in the present embodiment, the groove is formed on the case cover lateral side inner surface 66a). By forming such groove 66b, the volume of the mold resin 80 which can be held by the lateral side space 69 increases, thus unexpected leaking of the uncured mold resin 80 can be effectively prevented.

Note that, in the electronic component 10, the groove 66b is formed to the case cover lateral side inner surface 66a of the case cover lateral side portion 66 among the surfaces of case cover lateral side portion 66 and accommodation side wall 24 which are facing each other, however, the groove which widens the width of the lateral side space 69 is not limited to this. For example, the groove which widens the width of the lateral side space 69 may be formed to the side wall outer surface 24a of the accommodation side wall 24; or the groove 66b may be formed on both of the case cover lateral side inner surface 66a and the side wall outer surface 24a. Also, as shown in FIG. 3, in the electronic component 10, the groove 66b is formed to two places on the case cover lateral side inner surface 66a, however, the number of grooves 66b may one or three or more.

As shown in FIG. 2 which is a cross section of the electronic component 10, regarding the case 20, an upper face of the base board 22 configures the bottom face of the accommodation part 21, and a lower face of the base board 22 faces the opposite direction of the opening 21a and configures the bottom face of the case 20. The lower face of the base board 22 of the case 20 is roughly parallel to the lower face of the first mounting part 42 of the first metal terminal 40 and to the lower face of the second mounting part 52 of the second metal terminal 50. The lower face of the base board 22 of the case 20 is arranged to the position slightly at upper side than the bottom face of the first mounting part 42 of the first metal terminal 40 and the bottom face of the second mounting part 52 of the second metal terminal 50. Note that, the lower face of the base board 22 may be arranged on the same plane as the bottom face of the first mounting part 42 of the first metal terminal 40 and the bottom face of the second mounting part 52 of the second metal terminal 50. The position of the lower face of the base board 22 and the bottom faces of the first and second mounting parts 42 and 52 in Z-axis direction is not particularly limited.

As shown in FIG. 2, the ceramic element 30 is arranged in the accommodation part 21 of the case 20. The ceramic element 30 has a first main face 31a and the second main face 31b facing to each other, and the ceramic element 30 has an outer shape of approximately circular disk form. Note that, the ceramic element 30 may be in any shape other than circular disk shapes such as an oval disk shape, a rectangular plate shape, and so on. Note that, the first main face 31a and the second main face 31b are a pair of faces (planes) having the largest areas in the ceramic element 30. Also, as shown in FIG. 2, regarding the ceramic element 30 of the electronic component 10, among the two main faces, the first main face 31a is facing to the opening 21a side (upper direction), and the second main face 31b is facing to the opposite side of the opening 21a (lower direction, the side of the bottom face 21c). Note that, regarding other embodiments such that the opening 21a of the case 20 is facing to a different direction from the electronic component 10 according to the present embodiment, the direction which each main face is facing may be different from that of the first embodiment.

As shown in FIG. 2, the ceramic element 30 has a first electrode 33 formed to the first main face 31a, a second electrode 34 formed to the second main face 31b, and a dielectric part 35 placed between the first electrode 33 and the second electrode 34. A material of the dielectric part 35 is not particularly limited, and for example, it may be dielectric materials such as calcium titanate, strontium titanate, barium titanate, a mixture of these, and so on. Note that, the ceramic element 30 is not particularly limited to a capacitor and the like in which the dielectric part 35 is placed between the first electrode 33 and the second electrode 34. For example, a ceramic element may be a varistor, a thermistor, and the like in which semiconductor ceramics is placed between a first electrode and a second electrode.

Materials of the first electrode 33 and the second electrode 34 are not particularly limited, and usually copper, copper alloy, nickel, nickel alloy, and the like may be used, and also silver, and alloy of silver and palladium, and the like can be used as well. The thicknesses of the first electrode 33 and the second electrode 34 are not particularly limited, and usually the thicknesses may be within a range of 10 to 50 μm or so. Note that, the surfaces of first and second electrodes 33 and 34 may have a metal coating made by using at least one selected from Ni, Cu, Sn, and so on.

As shown in FIG. 2, an accommodation depth W2, which is a distance from the opening 21a to the bottom face 21c of the accommodation part 21 of the case 20, is larger than an element thickness W1 which is a distance between the first main face 31a and the second main face 31b of the ceramic element 30. Thereby, the electronic component 10 accommodates the entire ceramic element 30 in the accommodation part 21 without exposing part of the ceramic element 30 from the opening 21a of the accommodation part 21. Also, such electronic component 10 can simplify the shape of the case cover 60. Also, the entire ceramic element 30 can be covered by the mold resin 80 by filling the accommodation part 21 with the mold resin 80.

As shown in FIG. 2 and FIG. 4, the electronic component 10 has a first electrode terminal 40 and a second terminal electrode 50 which are a pair of metal terminals. The metal terminal 40 and the metal terminal 50 each has an electrode connecting part (a first electrode connecting part 44 and a second electrode connecting part 54) connecting to the ceramic element 30, a mounting part (a first mounting part 42 and a second mounting part 52) exposed out of the accommodation part 21, and a terminal arm part (a first terminal arm part 46 and a second terminal arm part 56) connecting the electrode connecting part and the mounting part.

The first metal terminal 40 and the second metal terminal 50 are arranged to the electronic component 10 by taking space in between each other, thus these two are electrically insulated. The first metal terminal 40 and the second metal terminal 50 are formed, for example, by mechanically processing a conductive metal board, and a method of forming the metal terminals 40 and 50 are not limited to this.

As shown in FIG. 2 and FIG. 4, the first metal terminal 40 has a first electrode connecting part 44 connecting to the first electrode 33 of the ceramic element 30, a first mounting part 42 exposed out of the accommodation part 21 through the opening 21a (including the first space 27 which is part of the opening 21a), and a first terminal arm part 46 connecting the first electrode connecting part 44 and the first mounting part 42. Regarding the first metal terminal 40, the first electrode connecting part 44 and the first terminal arm part 46 (including the part arranged in the first space 27) are arranged to the accommodation part 21 and the opening 21a, and the first mounting part 42 is exposed out of the accommodation part 21 and the opening 21a.

As shown in FIG. 2, the first mounting part 42 has an approximately L-shaped form. The first mounting part 42 has a space passing part 42b arranged to the lateral side space 69, and a mounting base part 42a which is facing to the side of the mounting face and at an area close to an end part 42c which is at the opposite side to the first electrode connecting part 44 of the first metal terminal 40 than the space passing part 42b. The space passing part 42b perpendicularly bends from the first terminal arm part 46 and extends downward along the side wall outer surface 24a, then it bends approximately perpendicularly at the position slightly exceeding the lower face of the base board 22 in downward direction. The tip of the first mounting part 42 extends along the direction approximately parallel to the lower face of the base board 22 and extends in a direction moving away from the case 20. Note that, as the shape of the first mounting part 42, it is not limited to the one shown in FIG. 2, and the tip of the first mounting part 42 may face the lower face of the base board 22.

As shown in FIG. 2 and FIG. 4, in the first metal terminal 40, the parts corresponding to the first electrode connecting part 44 and the first terminal arm part 46 have shapes which are approximately flat rectangular plate form. Among the parts having shapes of flat plate form which corresponds to the first electrode connecting part 44 and the first terminal arm part 46, a part facing the first main face 31a of the ceramic element 30 is the first electrode connecting part 44. Also, the first terminal arm part 46 is a part which extends along an extension surface of the first main face 31a and extends towards the first space 27 via the first electrode connecting part 44.

As shown in FIG. 2, the second metal terminal 50 has a second electrode connecting part 54 connecting to the second electrode part 34 of the ceramic element 30, the second mounting part 52 exposed out of the accommodation part 21 through the opening 21a (including a second space 28 which is part of the opening 21a), and a second terminal arm part 56 connecting the second electrode connecting part 54 and the second mounting part 52. Regarding the second metal terminal 50, the second electrode connecting part 54 and the second terminal arm part 56 (including the part that the second space 28 is arranged) are arranged to the accommodation part 21 and the opening 21a, and the second mounting part 52 is exposed out of the accommodation part 21 and the opening 21a.

As shown in FIG. 2, the second mounting part 52 has an approximately L-shaped form, and is arranged roughly symmetrical to the first mounting part 42. The second mounting part 52 has a space passing part 52b arranged to the lateral side space 69. The second mounting part 52 also has a mounting base part 52a which is facing the mounting face side and is an area closer to an end part 52c than the space passing part 52b, in which the end part 52c is at the opposite side of the second electrode connecting part 54 of the second metal terminal 50. The space passing part 52b perpendicularly bends from the first terminal arm part 56 and extends downward along the side wall outer surface 24a, then it bends approximately perpendicularly at the position slightly exceeding the lower face of the base board part 22 in downward direction. As similar to the first mounting part 42, the shape of the second mounting part 52 is not limited to the shape shown in FIG. 2.

As shown in FIG. 2 and FIG. 4, the part corresponding to the second electrode connecting part 54 of the metal terminal 50 has a shape of a flat plate form, and the part corresponding to the second terminal arm part 56 includes two bent portions. The second electrode connecting part 54 faces against the second main face 31b of the ceramic element 30. Also, the second electrode connecting part 54 faces the base board 22 configuring the bottom face of the accommodation part 21. Therefore, the second electrode connecting part 54 is held from upper and lower directions with the base board 22 of the accommodation part 21 and the second main face 31b of the ceramic element 30.

As shown in FIG. 2, the second terminal arm part 56 of the second metal terminal 50 has three portions as described in below. A first portion 56b of the second terminal arm part 56 extends along the extension surface of the second main face 31b toward an accommodation side wall 24 from the second electrode connecting part 54. Also, a rising part 56a is a second portion of the second terminal arm part 56 which is bent roughly perpendicularly from the first portion 56b following the extension surface of the second main face 31b, and the rising part 56a extends upwards from the base board 22 to the opening 21a at the upper side. Also, as shown in FIG. 4 and FIG. 5, a third portion 56c of the second terminal arm part 56 is arranged at the second space 28 by bending roughly perpendicularly from the rising part 56a. The tip of the third portion 56c connects to the second mounting part 52.

Materials of the first metal terminal 40 and the second metal terminal 50 are not particularly limited as long as conductive metals are used, and for example, iron, nickel, copper, silver, alloy of these, and so can be used. Also, the first metal terminal 40 and the second metal terminal 50 may have metal coatings such as Ni, Sn, Cu, and the like on the surfaces.

The electronic component 10 can suitably protect the members such as the ceramic element 30 arranged in the accommodation part 21 by sealing the accommodation part 21 with the case cover 60. The opening edge 24c of frame-like form surrounding the opening 21a shown in FIG. 4 connects with the case cover lower surface 63a of the closing plate part 63 shown in FIG. 2, and the closing plate part 63 of the case cover 60 covers the opening 21a of the accommodation part 21. Note that, between the case cover 60 and the case 20, the first space 27 where the first metal terminal 40 passes through and the second space 28 where the second metal terminal 50 passes through are formed. Also, the lateral side space 69 is formed between the case 20 and the case cover lateral side portion 66 of the case cover 60.

An area surrounding the case cover lateral side inner surface 66a of the case cover 60 shown in FIG. 5 is slightly larger than an area surrounded by the side wall outer surface 24a of the case 20 shown in FIG. 4. Thereby, as shown in FIG. 2, when the case cover 60 is assembled to the case 20, the lateral side space 69 with appropriate width can be formed. For example, the lateral side space 69 is about 0.3 to 0.7 mm on average along the circumference direction, and thereby leakage of the uncured mold resin can be prevented, while suppressing the relative position shifting of the case 20 against the case cover 60. Note that, when the groove 66b as shown in FIG. 3 is formed, the width of the lateral side space 69 other than the groove 66b may be substantially zero.

For example, the case 20 and the case cover 60 can be produced by injection molding using resin. Note that, materials of the case 20 and the case cover 60 are not limited to resin.

For example, the electronic component 10 shown in FIG. 1 to FIG. 5 can be produced through below described steps. First, the ceramic element 30, the first metal terminal 40, and the second metal terminal 50 are prepared; and the first metal terminal 40 and the second metal terminal 50 are connected to the ceramic element 30. The first metal terminal 40 and the second metal terminal 50 can be connected to the ceramic element 30 by using solder, conductive adhesives, and the like.

Next, the first metal terminal 40, the second metal terminal 50, and the ceramic element 30 integrally forms an intermediate product, then this is arranged in the accommodation part 21 of the case 20. Then, the uncured mold resin is poured in the accommodation part 21 from the opening 21a. While the mold resin is uncured, the case cover 60 is installed to the case 20, and the mold resin is cured. Thereby, the case cover 60 and the case 20 are firmly fixed via the mold resin. As such, the electronic component 10 shown in FIG. 1 to FIG. 5 can be produced.

Note that, the step of connecting the first metal terminal 40 and the second metal terminal 50 to the ceramic element 30 may be carried out while the mounting base parts 42a and 52a of the first metal terminal 40 and the second metal terminal 50 are not bent.

As such, the electronic component 10 shown in FIG. 1 to FIG. 5 accommodates the ceramic element 30 to the accommodation part 21 of the case 20, hence there is no need of a step of molding by using the exterior material after arranging the ceramic element 30 and so on in the cavity for resin molding. Thus, a good productivity is achieved.

The electronic component 10 can accommodate the ceramic element 30 in the case 20, thus as long as it can fit inside the case 20, the size of the ceramic element 30 can be flexibly changed. Also, the first mounting part 42 and the second mounting part 52 are parallel to the first main face 31a and the second main face 31b of the ceramic element 30. Thus, the electronic component 10 can achieve lower height and is suited for surface mounting.

Also, in the electronic component 10, the mold resin 80 fills the accommodation part 21, thus the ceramic element 30 and so on inside the accommodation part 21 can be easily protected. Further, the lateral side space 69 between the case cover lateral side portion 66 and the accommodation side wall 24 holds the excess mold resin 80, thus unexpected adhesion of the uncured mold resin to the outer surface of product which has leaked from the accommodation part 21 can be prevented. Note that, the case cover lateral side portion 66 and the accommodation side wall 24 preferably surrounds the closing plate part 63 or the base board 22 in a continuous manner, however, discontinuous parts may be partially formed.

Second Embodiment

Figure 6:
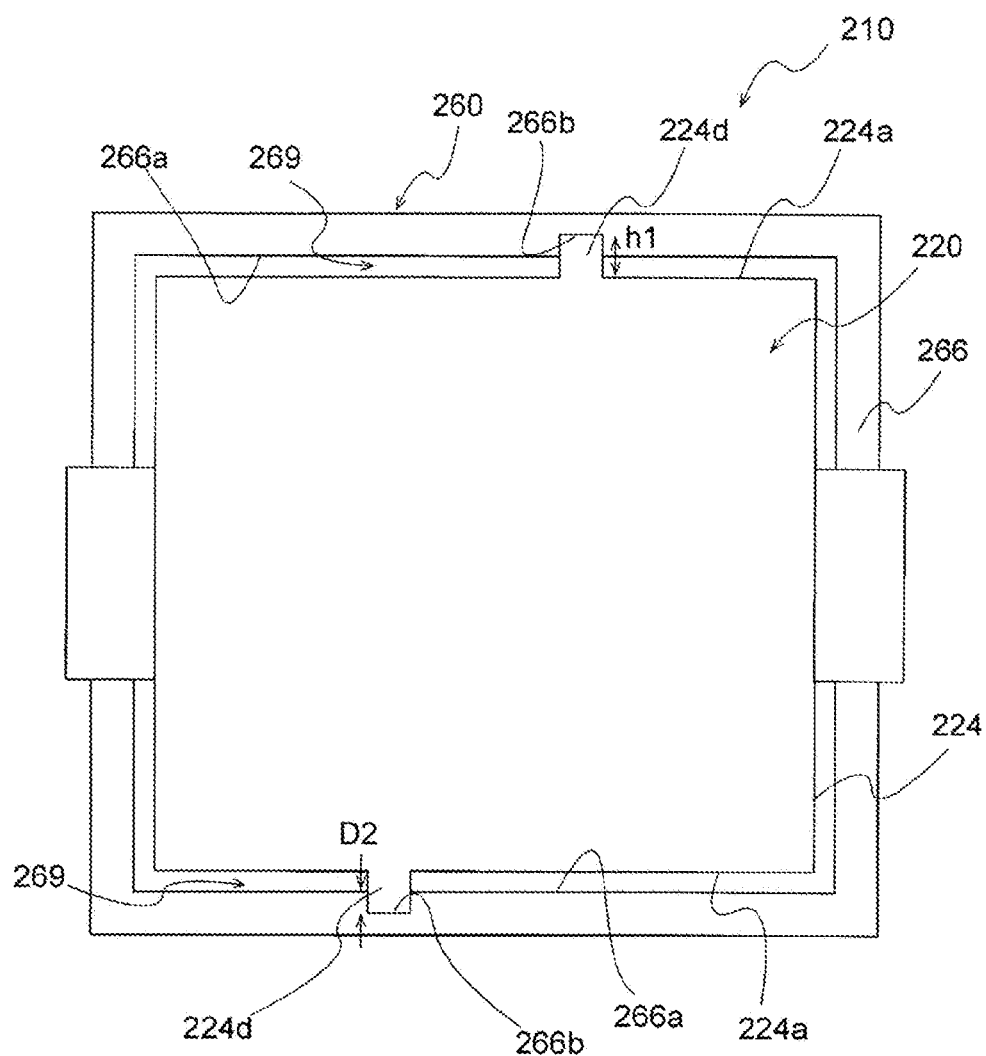
FIG. 6 is a bottom view of an electronic component according to the second embodiment.
Figure 7:
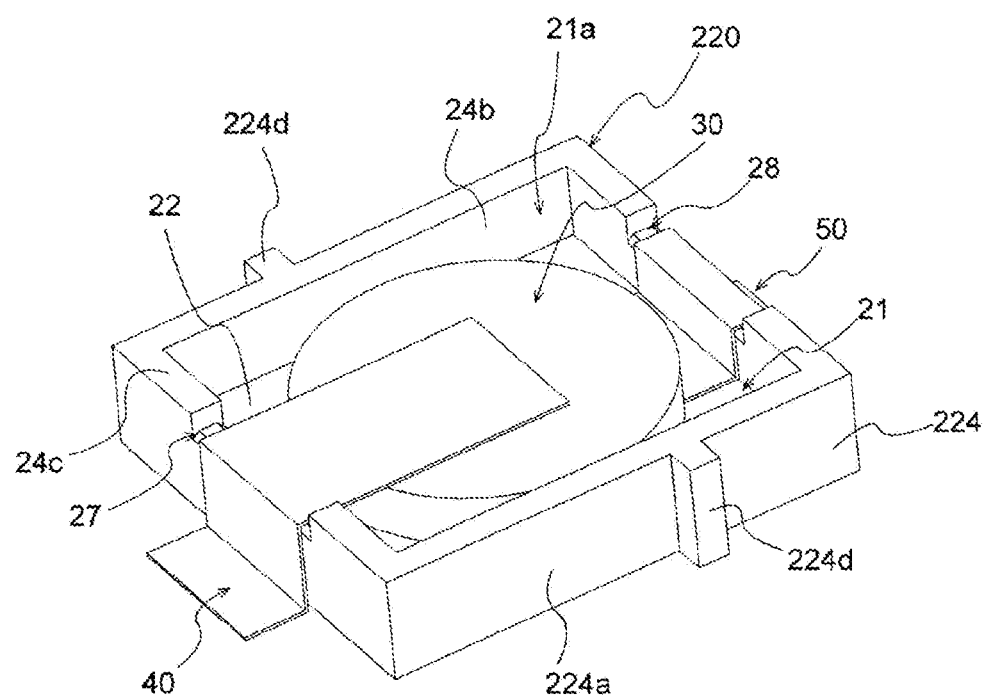
FIG. 7 is a schematic perspective view of the electronic component shown in FIG. 6 viewing from diagonally above without a case cover and a mold resin.
Figure 8:
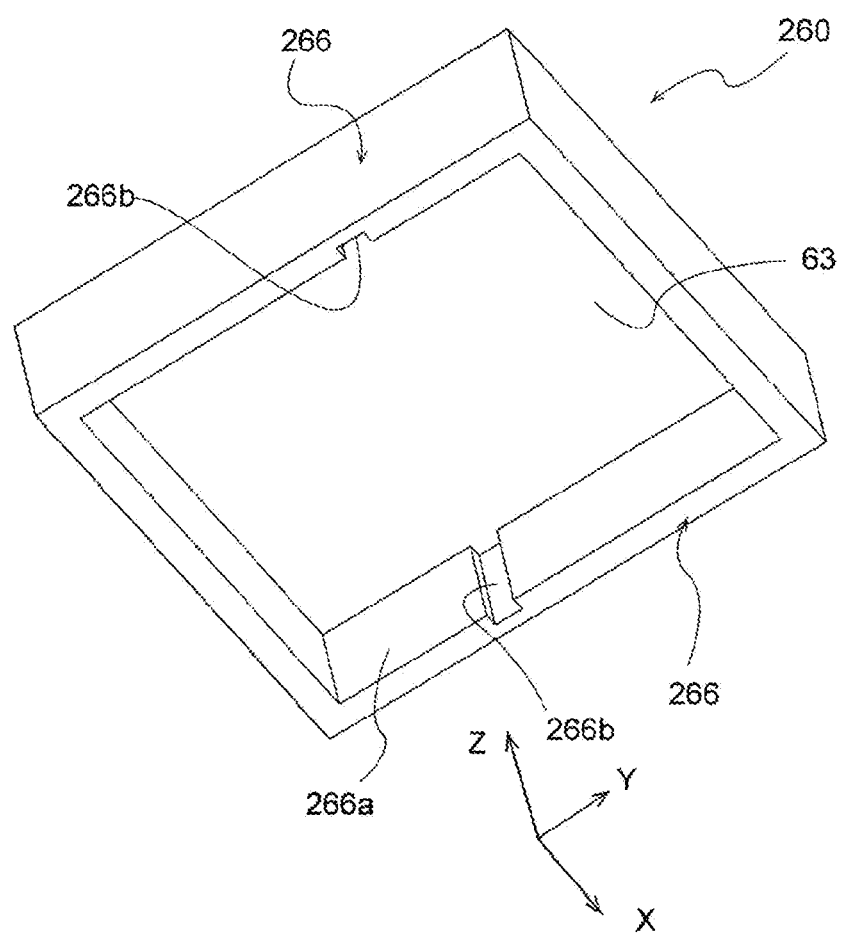
FIG. 8 is a schematic perspective view of the case cover of the electronic component shown in FIG. 6 viewing from diagonally below.

FIG. 6 is a bottom view of an electronic component 210 according to the second embodiment. FIG. 7 is a perspective view of the electronic component 210 which is not showing a case cover 260 and a mold resin. FIG. 8 is a perspective view of the case cover 260 of the electronic component 210 looking from diagonally below. The electronic component 210 according to the second embodiment is basically the same as the electronic component 10 according to the first embodiment except that a shape of a side wall outer surface 224a of the accommodation side wall 224 of a case 220 and a shape of a case cover lateral side inner surface 266a of a case cover lateral side portion 266 of the case cover 260 are different. Regarding the electronic component 210, parts which are different from the first embodiment will be mainly described, and for parts which are the same as the first embodiment are given the same reference numbers and the explanation will be omitted.

As shown in FIG. 6, regarding the electronic component 210, as similar to the electronic component 10, the case cover lateral side inner surface 266a of the case cover lateral side portion 266 and the side wall outer surface 224a of the accommodation side wall 224 are facing each other. Also, a lateral side space 269 is formed between the case cover lateral side inner surface 266a and the side wall outer surface 224a, and the lateral side space 269 prevents the leakage of the excess mold resin 80 (see FIG. 2) to the outer surface of the product.

As shown in FIG. 7, a raised part 224d is formed to the side wall outer surface 224a which is one surface among the case cover lateral side inner surface 266a and the side wall outer surface 224a facing against each other. Also, as shown in FIG. 8, a depression 266b, to which the raised part 224d fits, is formed to the case cover lateral side inner surface 266a which is the other surface among the case cover lateral side inner surface 266a and the side wall outer surface 224a facing against each other.

As shown in FIG. 6, the projection part 224d projects out from the side wall outer surface 224a towards the case cover lateral side inner surface 266a. A projection height h1 of the raised part 224d is larger than a depth D2 of the depression 266b formed to the case cover lateral side inner surface 266a. At the part of the depression 266b where the projection part 224d fits, the width of the lateral side space 269 is narrower than other parts of the lateral side space 269.

Regarding the electronic component 210 shown in FIG. 6 to FIG. 8, since the depression 266b and the projection part 224d engages with each other, the relative position of the case 220 and the case cover 260 can be adjusted accurately, hence, the shape of the lateral side space 269 which holds the mold resin 80 can be accurately regulated. Therefore, the leakage of the mold resin 80 can be effectively prevented. Also, the fixing strength between the case cover 260 and the case 220 can be enhanced.

Also, as shown in FIG. 6, regarding the electronic component 210, the width of the lateral side space 269 other than the part where the raised part 224d and the depression 266b are engaging can be widened evenly compared to the case which does not have the raised part 224d. Therefore, the volume of the lateral side space 269 holding the mold resin 80 can be enlarged evenly, thus the effect of preventing the leakage of the mold resin 80 can be enhanced. Also, the parts of the electronic component 210 which are in common with the electronic component 10 exhibit the same effects as the electronic component 10 are exhibited.

First Modification Example

Figure 9:
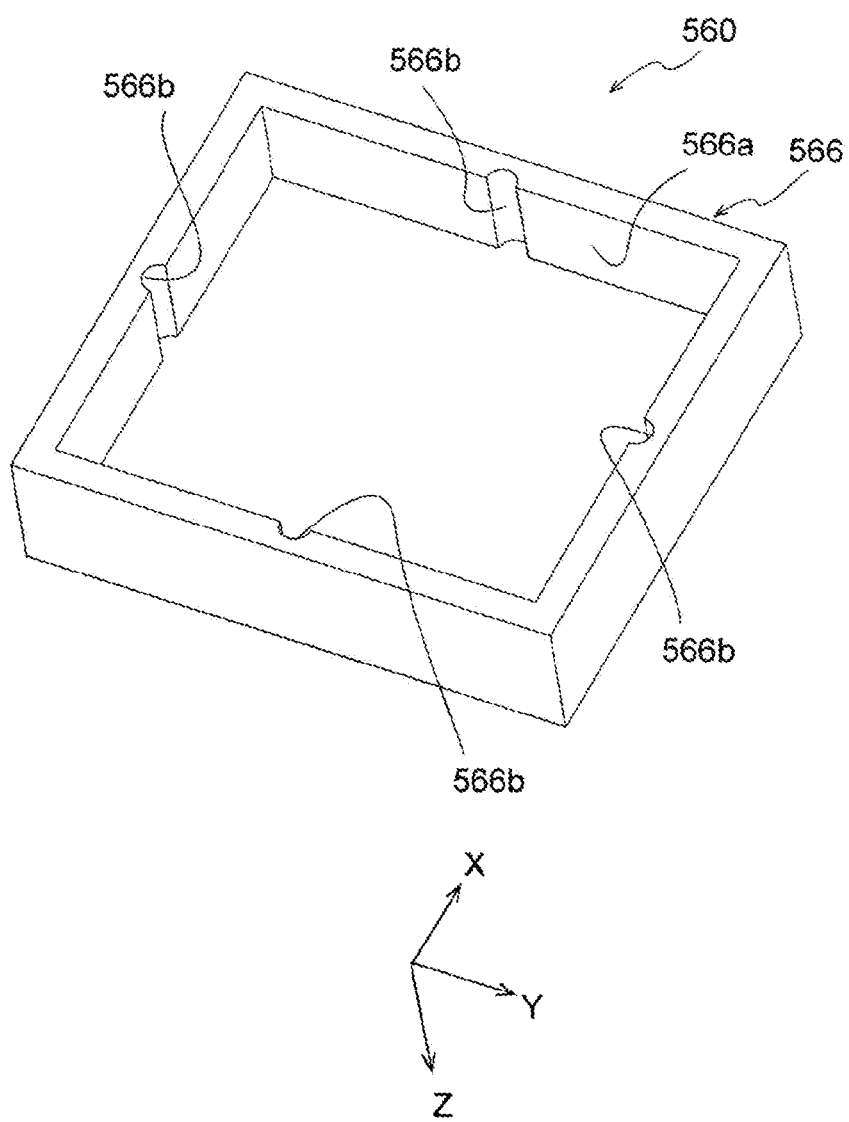
FIG. 9 is a schematic perspective view of a case cover according to a first modification example viewing from diagonally below.

FIG. 9 shows an outer appearance of a case cover 560 according to the first modification example which is looking from diagonally below. The case cover 560 can replace the case cover 60 shown in FIG. 5 of the electronic component 10 according to the first embodiment. Regarding the case cover 560 shown in FIG. 9, total of four grooves 566b are formed to each surface of four surfaces configuring case cover lateral side inner surfaces 566a of a case cover lateral side portion 566.

As in case of the case cover 560, by forming the grooves 566b to each surface of the case cover lateral side inner surfaces 566a, the leakage of the uncured mold resin can be effectively prevented; for example, the leakage from the position which has the furthest distance from a groove 566b within a space between the case cover lateral side inner surface 566a and the side wall outer surface 24a (see FIG. 3) can be prevented. Note that, the number of the grooves 566b formed to the case cover lateral side inner surfaces 566a can be changed depending on variation of the viscosity and the filling rate of the mold resin; and it is not limited to those shown in the embodiments and the modification examples.

Regarding an electronic component which uses the case cover 560 according to the first modification example instead of the case cover 60 shown in FIG. 5, the parts which are in common with the electronic component 10 exhibit the same effects as the electronic component 10 according to the first embodiment.

Second Modification Example

Figure 10:
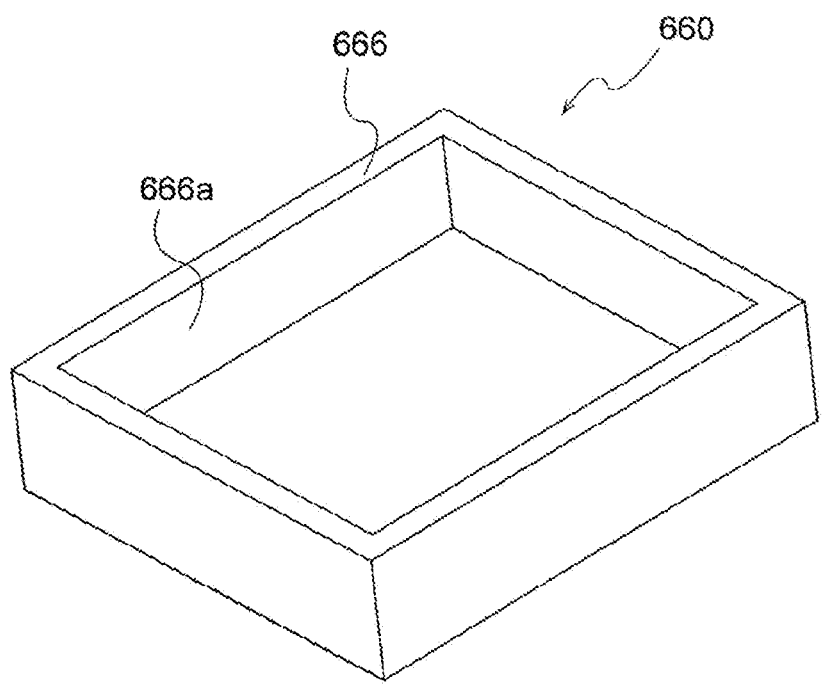
FIG. 10 is a schematic perspective view of the case cover according to a second modification example viewing from diagonally below.

FIG. 10 is an outer appearance of a case cover 660 according to the second modification example looking from diagonally below. The case cover 660 can be used in place of the case cover 260 shown in FIG. 8 of the electronic component 210 according to the second embodiment. Regarding the case cover 660 shown in FIG. 10, none of surfaces configuring case cover lateral side inner surfaces 666a of the case cover lateral side portion 666 have projection nor groove.

In case the case cover 660 shown in FIG. 10 is used to the case 220 shown in FIG. 7 and so on, the side wall outer surface 224a shown in FIG. 7 faces the case cover lateral side inner surface 666a shown in FIG. 10. In this case, the raised part 224d formed to the side wall outer surface 224a function as a projection which makes the width of the space between the case cover lateral side portion 666 and the accommodation side wall 224 narrow.

As such, regarding an electronic component using the case cover 660 according to the second modification example instead place of the case cover 260 shown in FIG. 8, due to the raised part 224d functioning as the projection, the case cover 660 can be assembled to the case 220 with higher precision. Also, while the case cover 660 and the case 220 are fixed firmly at the part where the lateral side space is narrow; at a part where the lateral side space is wide, further amount of the mold resin is held. Also, regarding an electronic component using the case cover 660 shown in second modification example in place of the case cover 60 shown in FIG. 8, the parts which are in common with the electronic component 210 exhibit the same effects as the electronic component 210 according to the second embodiment.

Third Modification Example

Figure 11:
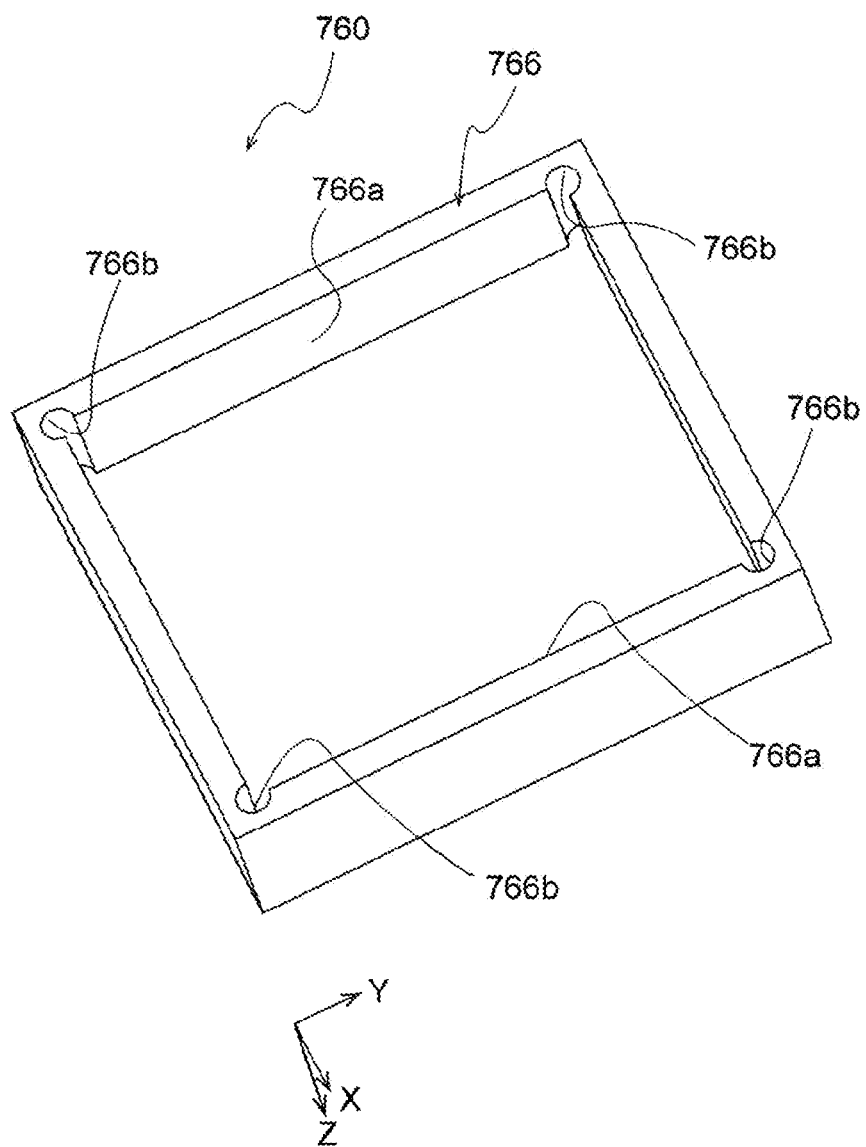
FIG. 11 is a schematic perspective view of a case cover according to a third modification example viewing from diagonally below.

FIG. 11 is an outer appearance of a case cover 760 according to the third modification example looking from diagonally below. In the electronic component 10 according to the first embodiment, the case cover 760 can replace the case cover 60 shown in FIG. 5. Regarding the case cover 760 shown in FIG. 11, total of four grooves 766b are formed to the connecting positions where surfaces configuring case cover lateral side inner side surfaces 766a of the case cover lateral side portion are connected, that is the grooves 766b are formed to four corners of the case cover lateral side inner surfaces 766a of frame-like form.

As in case of the case cover 760, by forming the grooves 766b to the four corners which are the connecting positions of surfaces of the case cover lateral side surfaces 766a, for example, the grooves 766b are formed taking roughly equal spaces in between each other at the space formed between the case cover lateral side inner surfaces 766a and the side wall outer surfaces 24a (see FIG. 3). Thereby, the excess mold resin flows suitably to the grooves 766b, and effectively prevents the leakage of the uncured mold resin to the outer surface of the product. Also, regarding an electronic component using the case cover 760 according to the third modification example instead of the case cover 60 shown in FIG. 5, the parts which are in common with the electronic component 10 exhibit the same effects as the electronic component 10 according to the first embodiment.

Fourth Modification Example

FIG. 12 is an outer appearance of a case cover 860 according to the fourth modification example looking from diagonally below. In the electronic component 10 according to the first embodiment, the case cover 860 can replace the case cover 60 shown in FIG. 5. The case cover 860 shown in FIG. 12 has total of four grooves 866b, that is, two on each of surfaces facing each other among the four surfaces configuring case cover lateral side inner surfaces 866a of a case cover lateral side portion 866.

In the electronic component using the case cover 860, the grooves 866b are not equally spaced apart from each other and are formed at the space between the case cover lateral side inner surfaces 866a and the side wall outer surfaces 24a (see FIG. 3). However, the positions where the excess mold resin easily leaks out may vary depending on the shapes of the ceramic element 30 and the metal terminals 40 and 50 arranged in the case, a position where the uncured mold resin is applied, and so on. Regarding the case cover 860, by arranging the grooves 866b to the positions where the mold resin tends to easily leaks out, this can effectively prevent the uncured resin from leaking out to the outer surface of the product. Also, for the electronic component using the case cover 860 according to the fourth modified example instead of the case cover 60 shown in FIG. 5, the parts which are in common with the electronic component 10 exhibit the same effects as the electronic component 10 according to the first embodiment.

Third Embodiment

Figure 13:
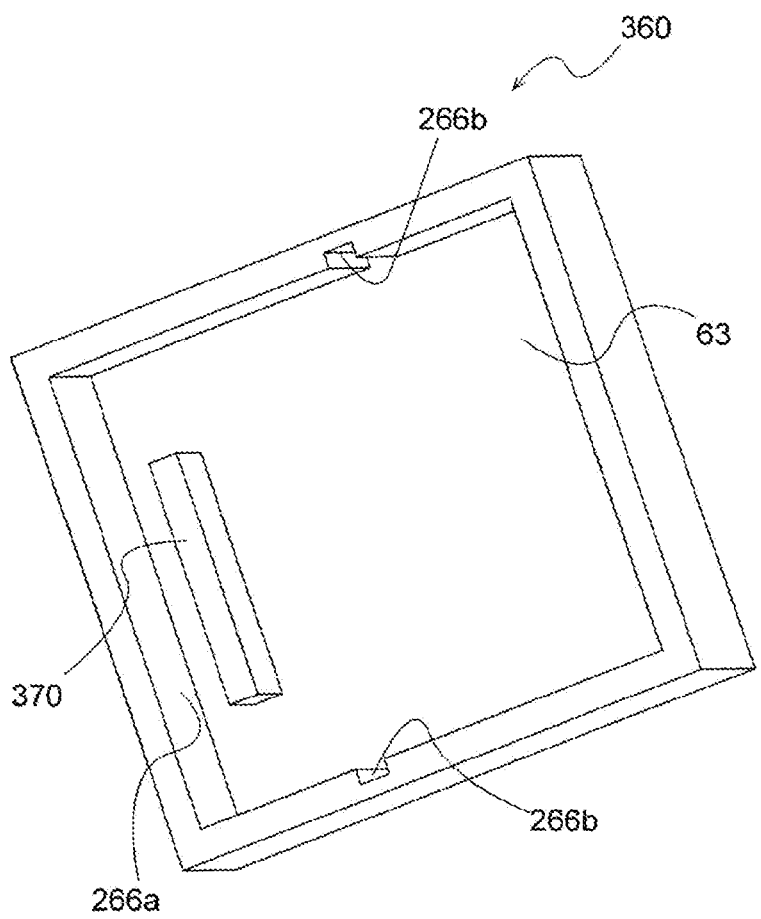
FIG. 13 is a schematic perspective view of a case cover and an insulation member of an electronic component according to the third embodiment viewing from diagonally below.
Figure 14:
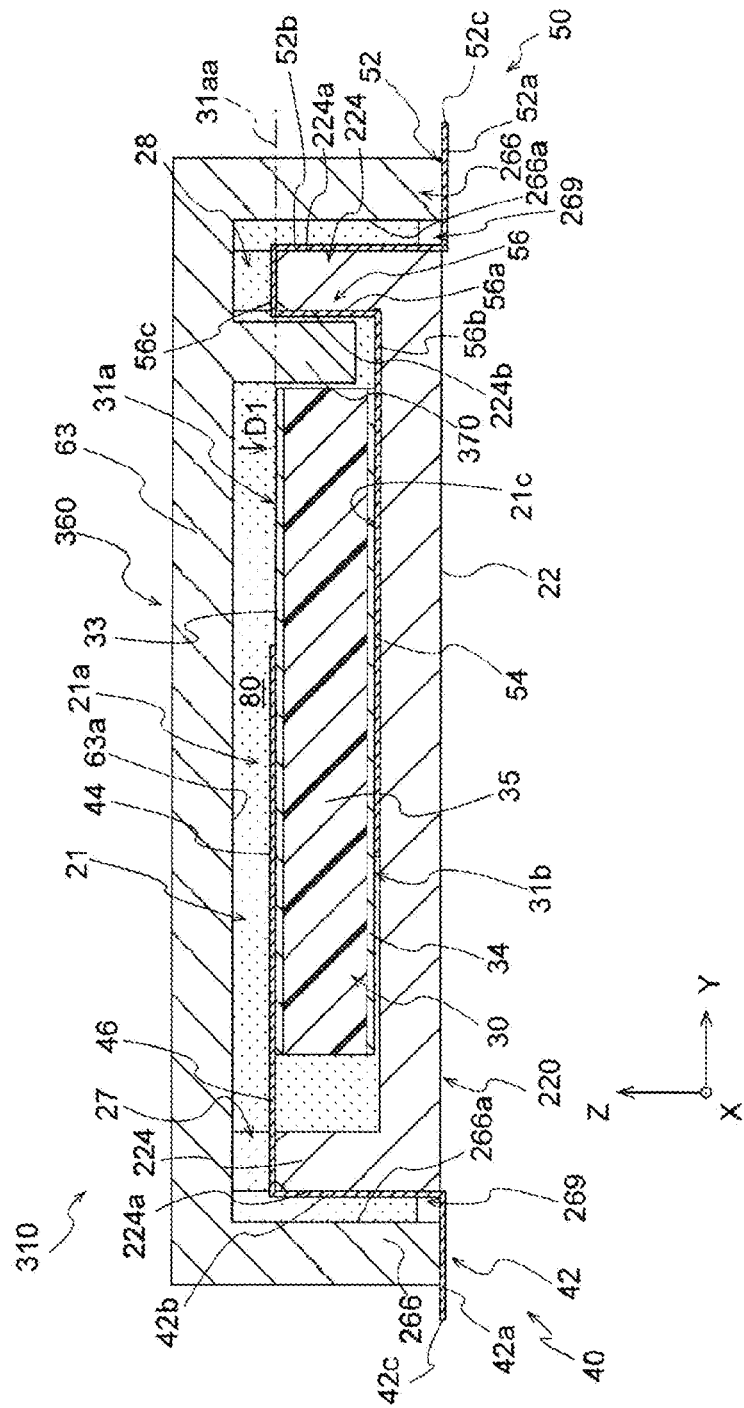
FIG. 14 is a cross section of the electronic component shown in FIG. 13.

FIG. 13 is an outer appearance of a case cover 360 used for an electronic component 310 according to the third embodiment viewing from diagonally below. FIG. 14 is a cross section of the electronic component 310. The electronic component 310 according to the third embodiment is basically the same as the electronic component 210 according to the second embodiment except that the electronic component 310 has an insulation member 370 which is integral with the case cover 360. The electronic component 310 will be described mainly on parts which are different from the electronic component 210 according to the second embodiment, and for the parts which are in common with the electronic component 210, the explanation will be omitted.

As shown in FIG. 13, the insulation member 370 is provided to the cover case lower surface 63a which is a surface of the closing plate part 63 facing the accommodation part 21. As shown in FIG. 14, the insulation member 370 projects to the lower direction (towards the bottom face 21c) from the case cover lower surface 63a of the case cover 60, and the insulation member 370 is arranged inside the accommodation part 21. In the accommodation part 21, the insulation member 370 is arranged between the first electrode 33 of the ceramic element 30 and the second terminal arm part 56 of the second metal terminal 50.

As shown in FIG. 14, preferably the insulation member 370 may be arranged to the accommodation part 21 of the case 20 so that the insulation member 370 crosses an extension surface 31aa of the first main face 31a of the ceramic element 30. Further, preferably, the insulation member 370 crosses a virtual line (in FIG. 14, this matches with the extension surface 31aa) which is the minimum distance connecting the first electrode 33 and the second terminal arm part 56 along the extension surface 31aa of the first main face 31a. By arranging as such, the insulation property between the first electrode 33 of the ceramic element 30 and the second terminal arm part 56 electrically connecting to the second electrode 34 can be enhanced effectively.

As shown in FIG. 14, the second metal terminal 50 electrically connecting to the second electrode 34 is exposed out of the accommodation part 21 through the opening 21a (including the second space 28). Thus, in the electronic component 310, the rising part 56a or the third portion 56c of the second terminal arm part 56 is arranged close to the first electrode 33 of the ceramic element 30 facing to the opening 21a. However, in the electronic component 310, the insulation member 370 is arranged between the first electrode 33 of the ceramic element 30 and the second terminal arm part 56 (particularly the rising part 56a), thereby a sufficient insulation distance between the first electrode 33 and the second terminal arm part 56 can be secured even in the small accommodation part 21.

At the case cover lateral side inner surface 266a of the case cover lateral side portion 266 of the case cover 360 included in the electronic component 310, two depressions 266b are formed as similar to the case cover 266 shown in FIG. 8. Also, in electronic component 310, as similar to the electronic component 210 shown in FIG. 6, while the case cover 360 is assembled to the case 220, the raised part 224d formed to the side wall outer surface 224a fits in the depression 266b formed to the case cover lateral side inner surface 266a.

As shown in FIG. 14, the lateral side space 269 is formed between the case cover lateral side inner surface 266a and the side wall outer surface 224a; and the lateral side space 269 holds the excess mold resin 80. Other than these, regarding the electronic component 310 according to the third embodiment, the parts which are in common with the electronic component 210 exhibit the same effects as the electronic component 210 according to the second embodiment.

Fourth Embodiment

Figure 15:
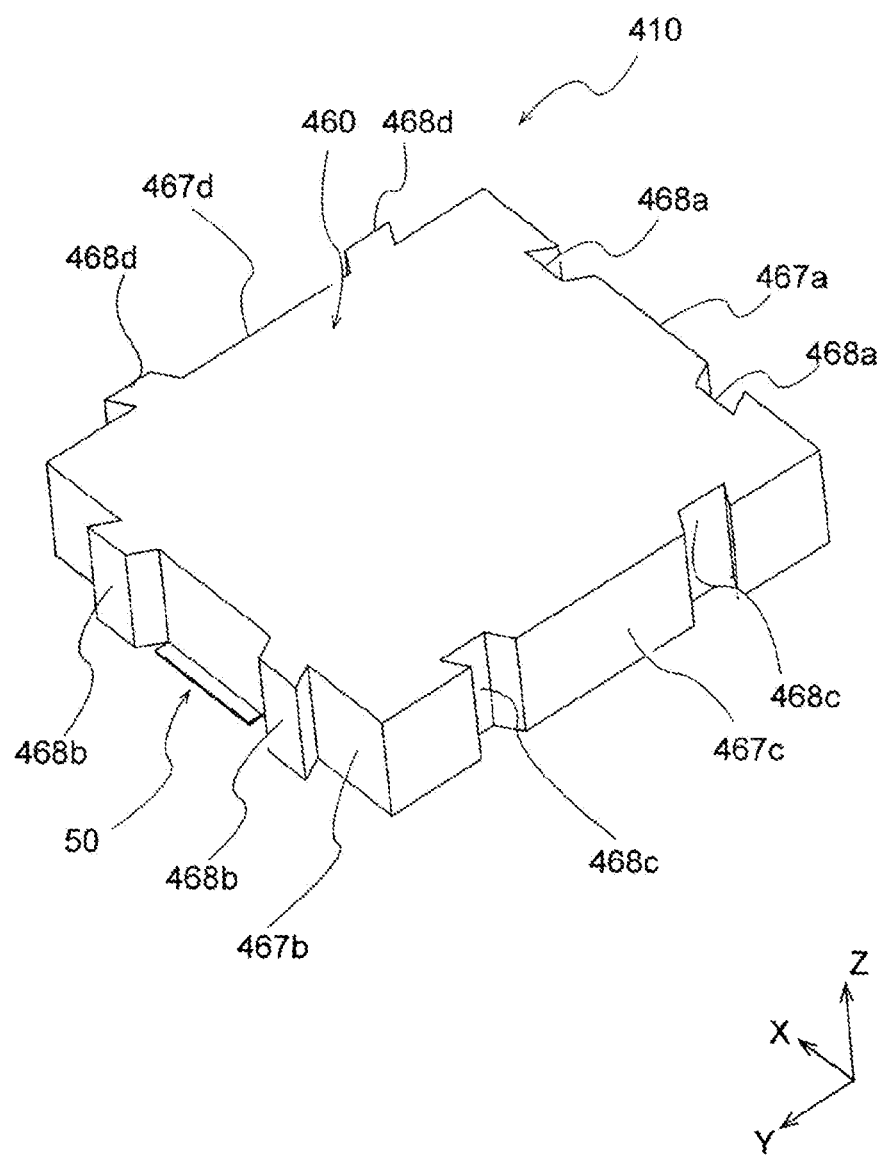
FIG. 15 is a schematic perspective view of an electronic component according to the fourth embodiment viewing from diagonally above.
Figure 16:
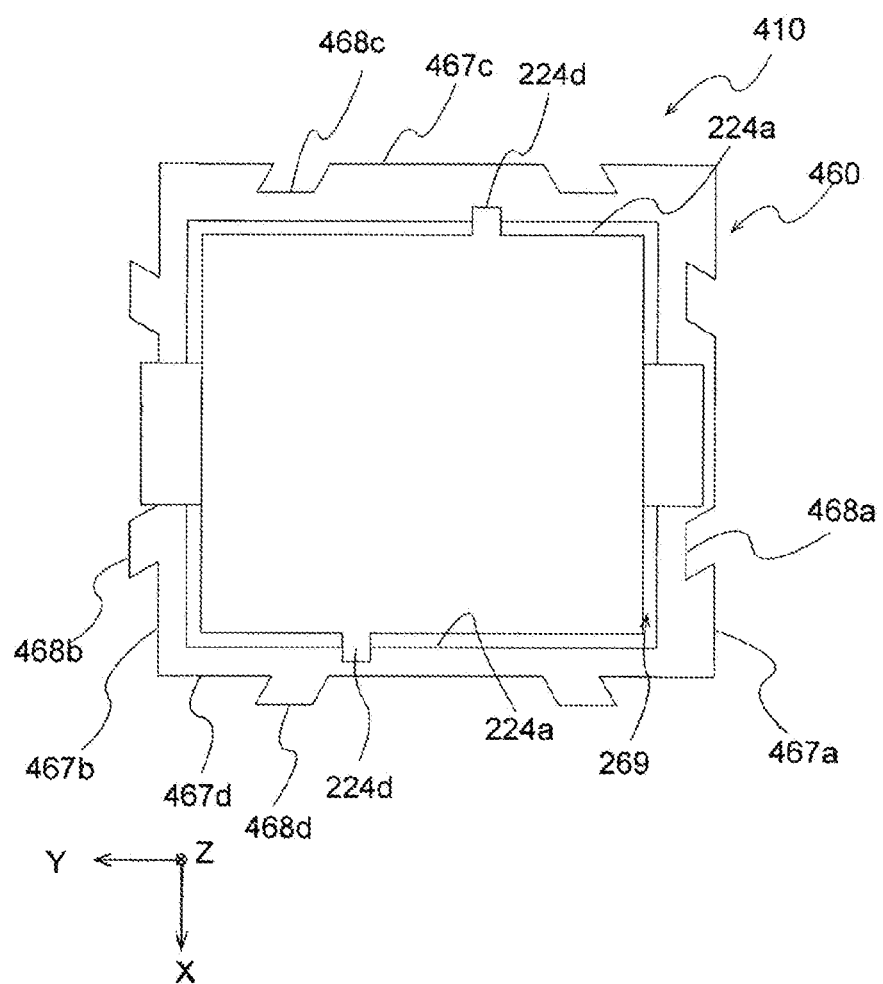
FIG. 16 is a bottom view of the electronic component shown in FIG. 15.

FIG. 15 is a schematic perspective view of the electronic component 410 according to the fourth embodiment looking from diagonally above. FIG. 16 is a bottom view of the electronic component 410. The electronic component 410 according to the fourth embodiment is basically the same as the electronic component 210 according to the second embodiment except that a first groove 468a and a second groove 468c or a first projection 468b and a second projection 468d are formed to the four outer surfaces (first to fourth outer surfaces 467a to 467d) of the case cover lateral side portion 466 of the case cover 460. The electronic component 410 will be described mainly on parts which are different from the electronic component 210 according to the second embodiment, and for the common parts, the explanation will be omitted.

As shown in FIG. 15 and FIG. 16, the first groove 468a is formed to the first outer surface 467a which is one of the outer surfaces of the case cover lateral side portion 266. Also, the first projection 468b which matches the shape of the first groove 468a is formed to the second outer surface 467b facing different direction (in the present embodiment, it is facing the opposite direction) from the first outer surface 467a of the case cover lateral side portion 266.

Figure 18:
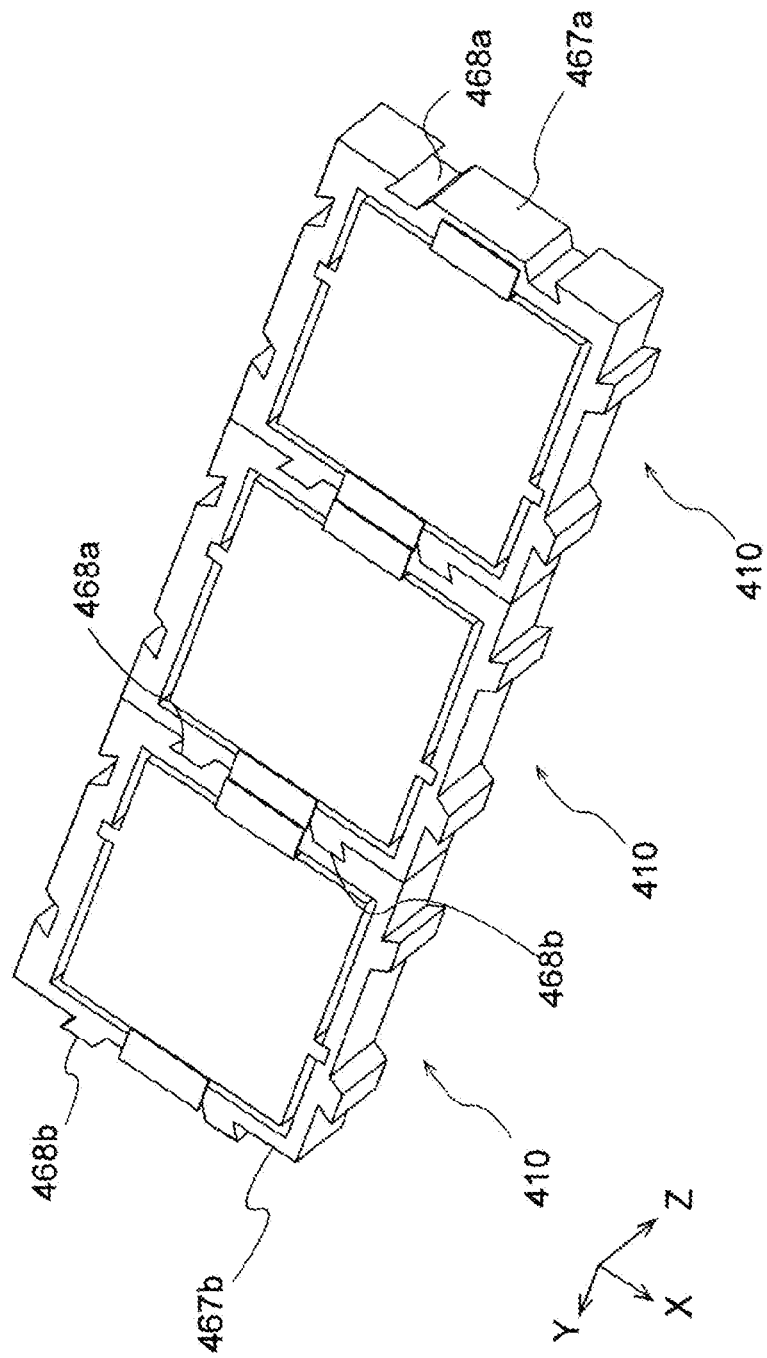
FIG. 18 is a schematic perspective view from diagonally below of which the electronic component shown in FIG. 15 is connected in plurality.

As shown in FIG. 18, a plurality of electronic components 410 can connect each other without using adhesives and the like by engaging the first groove 468a of one electronic component 410 with the first projection 468b of another electronic component 410. In FIG. 18, three electronic components 410 are connected in Y-axis direction by using the first projection 468b and the first groove 468a. However, the number of the electronic components 410 being connected can be two, or four or more.

Also, as shown in FIG. 15 and FIG. 16, the second groove 468c is formed to the third outer surface 467c which is one of the outer surfaces of the case cover lateral side portion 266. Further, the second projection 468c which matches the shape of the second groove 468d is formed to the fourth outer surface 467d facing the different direction (the opposite direction in the present embodiment) from the third outer surface 467c of the case cover lateral side portion 266.

Figure 17:
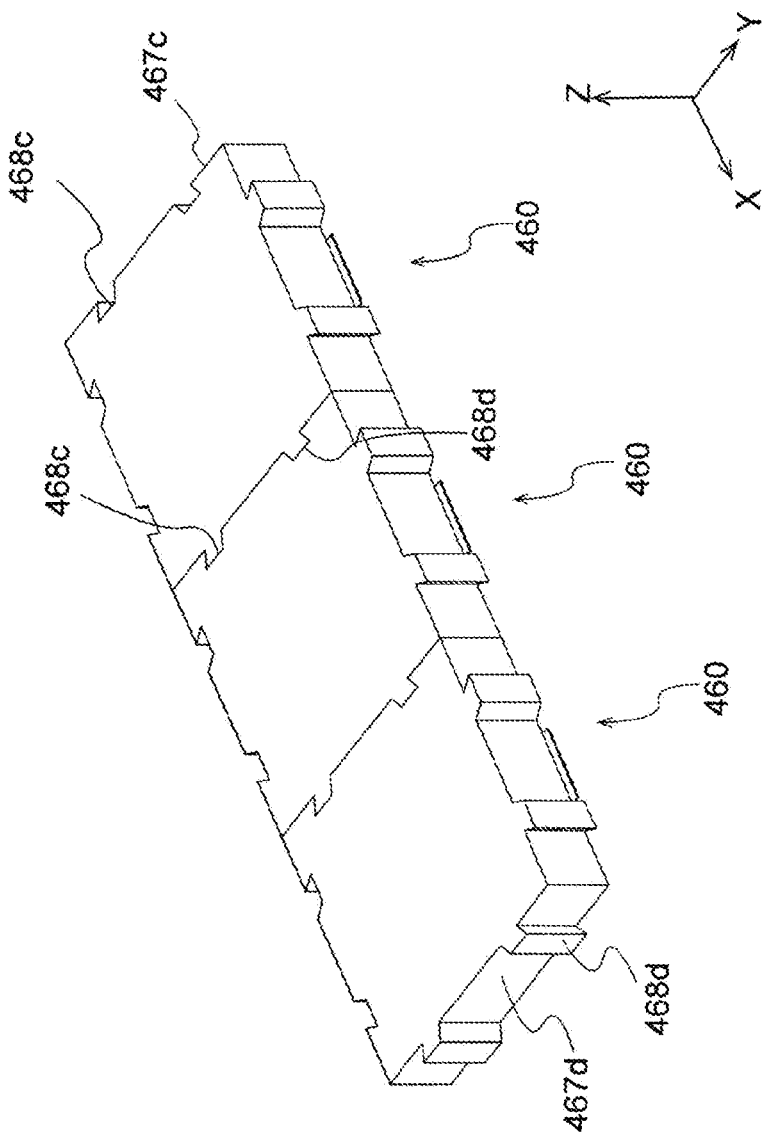
FIG. 17 is a schematic perspective view from diagonally above of which the electronic component shown in FIG. 15 is connected in plurality.

As shown in FIG. 17, the plurality of electronic components 410 can connect each other without using adhesives and the like by engaging the second groove 468c of one electronic component 410 with the second projection 468d of another electronic component 410. The number of the electronic components connected in X-axis direction using the second projection 468d and the second groove 468c are not limited to three as shown in FIG. 17, and any number of the electronic components 410 can be connected. The plurality of electronic components 410 can be connected in two dimensional directions (in X-axis direction and Y-axis direction) by using both the first projection 468b and the first groove 468a and the second projection 468d and the second groove 468c.

Regarding the electronic components 410 according to the fourth embodiment, the parts which are in common with the electronic component 210 exhibit the same effects as the second electronic component 210 according to the second embodiment.

Hereinabove, the electronic components 10, 210, 310, 410, and so on have been described using the embodiments and the modification examples, however, the shapes and structures of each member are not limited to these embodiments and modification examples; and these may be modified to other shapes and structures with same functionality. For example, in the electronic components 10, 210, 310, and 410, the base board 22 side of the case 20 was the mounting surface. On the contrary to this, the tips of the metal terminals 30 and 40 may expose to the closing plate part 63 side of the case covers 60, 260, 360, and 460; and the closing plate part 63 side of the case covers 60, 260, 360, and 460 may be the mounting surface.

NUMERICAL REFERENCES 10,210,310,410 . . . Electronic component
20,220 . . . Case
21 . . . Accommodation part
21a . . . Opening
21c . . . Bottom face
22 . . . Base bord
24,224 . . . Accommodation side wall
24a,224a . . . Side wall outer surface
24b . . . Side wall inner surface
24c . . . Opening edge
27 . . . First space
28 . . . Second space
30 . . . Ceramic element
31a . . . First main face
31aa . . . Extension surface
33 . . . First electrode
31b . . . Second main face
34 . . . Second electrode
35 . . . Dielectric part
40 . . . First metal terminal
44 . . . First electrode connecting part
42 . . . First mounting part
42b . . . Space passing part
42c . . . Terminal at opposite side
42a . . . Mounting base part
46 . . . First terminal arm part
50 . . . Second metal terminal
54 . . . Second electrode connecting part
52 . . . Second mounting part
52b . . . Space passing part
52c . . . Terminal at opposite side
52a . . . Mounting base part
56 . . . Second terminal arm part
56a . . . Rising part
56b . . . First portion
56c . . . Third portion
60,260,360,460,560,660,760,860 . . . Case cover
63 . . . Closing plate part
63a . . . Case cover lower surface
66,266,466,566,666,766,866 . . . Case cover lateral side portion
66a,266a,566a,666a,766a,866a . . . Case cover lateral side inner surface
66b,566b,766b,866b . . . Space groove
266b . . . Depression
69,269 . . . Lateral side space
467a to 467d . . . First to fourth outer surface
468a . . . First groove
468b . . . First projection
468c . . . Second groove
468d . . . Second projection
370 . . . Insulation member
80 . . . Mold resin
D1 . . . Depth direction
h1 . . . Height
D2 . . . Depth
224d . . . Raised part

What is claimed is:
1. An electronic component comprising
a case including an accommodation part having an opening and an accommodation side wall surrounding a space inside the accommodation part;
a ceramic element arranged in the accommodation part;
a metal terminal including an electrode connecting part connecting to the ceramic element, a mounting part exposed out of the accommodation part, and a terminal arm part connecting the electrode connecting part and the mounting part;

a case cover including a closing plate part covering the opening, and a case cover lateral side portion extending in a depth direction of the accommodation part from a circumference of the closing plate part and at least partially facing against the accommodation side wall; and a mold resin filling the accommodation part, wherein an inner surface of the case cover lateral side portion faces an outer surface of the accommodation side wall in a direction perpendicular to the depth direction, and a space is formed between the inner surface of the case cover lateral side portion and the outer surface of the accommodation side wall when viewed from a direction parallel to the depth direction.

2. The electronic component according to claim 1, wherein at least one of surfaces facing against each other between the case cover lateral side portion and the accommodation side wall has a groove partially widening a width of the space.

3. The electronic component according to claim 1, wherein at least one of surfaces facing against each other between the case cover lateral side portion and the accommodation side wall has a projection partially narrowing a width of the space.

4. The electronic component according to claim 1, wherein
the case cover lateral side portion and the accommodation side wall have surfaces facing against each other, and
one of the surfaces has a raised part and the other one has a depression to which the raised part fits.

5. The electronic component according to claim 1, wherein the mounting part is exposed out of the accommodation part through the opening, and
the mounting part comprises a space passing part arranged at the space and a mounting base part facing a mounting face.

6. The electronic component according to claim 1, wherein the accommodation side wall surrounds a circumference of a base board of the case, and
the case cover lateral side portion surrounds a circumference of the closing plate part.

7. The electronic component according to claim 1, wherein
the case cover lateral side portion has a first groove at a first outer side surface which is one surface of outer side surfaces of the case cover lateral side portion,
the case cover lateral side portion has a first projection corresponding to a shape of the first groove at a second outer side surface facing a direction different from the first outer side surface.

8. The electronic component according to claim 1 further comprising an insulation member arranged between an electrode of the ceramic element and the terminal arm part in the accommodation part.

9. The electronic component according to claim 1, wherein the inner surface of the case cover lateral side portion surrounds the outer surface of the accommodation side wall from all directions when viewed from the direction parallel to the depth direction.

10. The electronic component according to claim 1, wherein the case cover is fixed to the case by the mold resin.

* * * * *